(12) United States Patent
Pandey

(10) Patent No.: US 11,729,257 B2
(45) Date of Patent: *Aug. 15, 2023

(54) METHOD, APPARATUS, AND COMPUTER PROGRAM PRODUCT FOR BALANCING NETWORK RESOURCE DEMAND

(71) Applicant: Groupon, Inc., Chicago, IL (US)

(72) Inventor: Addhyan Pandey, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,637

(22) Filed: Jun. 16, 2022

(65) Prior Publication Data

US 2022/0400149 A1 Dec. 15, 2022

Related U.S. Application Data

(63) Continuation of application No. 15/855,918, filed on Dec. 27, 2017, now Pat. No. 11,418,578.

(60) Provisional application No. 62/440,279, filed on Dec. 29, 2016.

(51) Int. Cl.
| | | |
|---|---|---|
| *H04L 67/1001* | (2022.01) | |
| *H04L 47/70* | (2022.01) | |
| *G01S 19/14* | (2010.01) | |
| *G06N 5/04* | (2023.01) | |
| *G06N 20/00* | (2019.01) | |

(52) U.S. Cl.
CPC .......... *H04L 67/1001* (2022.05); *G01S 19/14* (2013.01); *G06N 5/04* (2013.01); *G06N 20/00* (2019.01); *H04L 47/82* (2013.01)

(58) Field of Classification Search
None
See application file for complete search history.

(56) References Cited

U.S. PATENT DOCUMENTS

| | | | |
|---|---|---|---|
| 10,264,050 B2 | 4/2019 | Todasco et al. | |
| 2013/0268357 A1 | 10/2013 | Heath | |
| 2014/0006465 A1* | 1/2014 | Davis | G06F 16/1752 |
| | | | 707/827 |
| 2016/0111920 A1 | 4/2016 | Pignier et al. | |
| 2017/0193410 A1 | 7/2017 | Jones-Mc-Fadden et al. | |
| 2018/0097905 A1 | 4/2018 | Todasco et al. | |
| 2022/0040557 A1 | 2/2022 | Tran | |

FOREIGN PATENT DOCUMENTS

| | | | | |
|---|---|---|---|---|
| CA | 2791782 A1 * | 9/2011 | ........... | G06F 16/248 |
| CA | 2791998 A1 * | 10/2011 | ............. | G06Q 20/10 |
| WO | 2016/155514 A1 | 10/2016 | | |

OTHER PUBLICATIONS

Bui et al., "A Survey of Anticipatory Mobile Networking: Context-Based Classification, Prediction Methodologies, and Optimization Techniques", Jun. 1, 2016, ARXIV, https://doi.org/10.48550/arXiv.1606.00191 (Year: 2016).*

Cruz et al., "Recurring Contacts between Groups of Devices: Analysis and Application", Jun. 22, 2018, IEEE, IEEE Transactions on Mobile Computing (vol. 17, Issue: 7, pp. 1666-1679) (Year: 2018).*

\* cited by examiner

*Primary Examiner* — Davoud A Zand
(74) *Attorney, Agent, or Firm* — Alston & Bird LLP

(57) ABSTRACT

Embodiments of the present invention provide methods, systems, apparatuses, and computer program products for predicting network asset requests for a future network time interval.

22 Claims, 7 Drawing Sheets

METHOD, APPARATUS, AND COMPUTER PROGRAM PRODUCT FOR BALANCING NETWORK RESOURCE DEMAND

CROSS-REFERENCE TO RELATED APPLICATIONS

The present application is a continuation of U.S. application Ser. No. 15/855,918, titled "METHOD, APPARATUS, AND COMPUTER PROGRAM PRODUCT FOR BALANCING NETWORK RESOURCE DEMAND," filed Dec. 27, 2017, which claims priority to U.S. Provisional Application Ser. No. 62/440,279, titled "METHOD, APPARATUS, AND COMPUTER PROGRAM PRODUCT FOR BALANCING NETWORK RESOURCE DEMAND," filed Dec. 29, 2016, the contents of each of which are incorporated herein by reference in their entirety.

BACKGROUND

Various systems are configured to provide network resources in response to network asset requests. Applicant has identified a number of deficiencies and problems associated with balancing network resource demand for any given network time period. Through applied effort, ingenuity, and innovation, many of these identified problems have been solved by developing solutions that are included in embodiments of the present invention, many examples of which are described in detail herein.

BRIEF SUMMARY

This specification relates to balancing predicted network resource demand based on a machine learning model.

In general, one innovative aspect of the subject matter described in this specification can be embodied in methods, systems, apparatuses, and computer program products for predictively balancing network resource demand in a network of network asset providers. In one embodiment a server is provided that, when executing instructions using its processor, is configured to generate a first prediction value that indicates a programmatically expected number of network asset search requests for a future network time interval. In embodiments, each network asset search request associated with a network asset provider group and each network asset provider group associated with a group location and a group network asset type. The server is further configured to, for each network asset provider record of a plurality of network asset provider records, where each network asset provider record comprises a network asset provider location and a network asset type, generate a second prediction value that indicates a programmatically expected number of network asset transactions for the future network time interval. The server is further configured to assign a network demand value to the network asset provider record, where the network demand value is based at least on the second prediction value of the network asset provider record and second prediction values of the other network asset provider records of the plurality of network asset provider records. The server is further configured to generate, based at least on the network demand value and the first prediction value, a third prediction value that indicates a programmatically number of network asset requests for the network asset provider record for the future network time interval.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages.

Allowing prediction of network asset requests more efficiently and accurately; more accurately predicting network demand for particular network asset providers which reduces the server stress; reduction in server processing stress associated with predicting required system resource volumes to fulfill network asset requests in a given future network period which significantly reduces the processing power requirement of the server.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
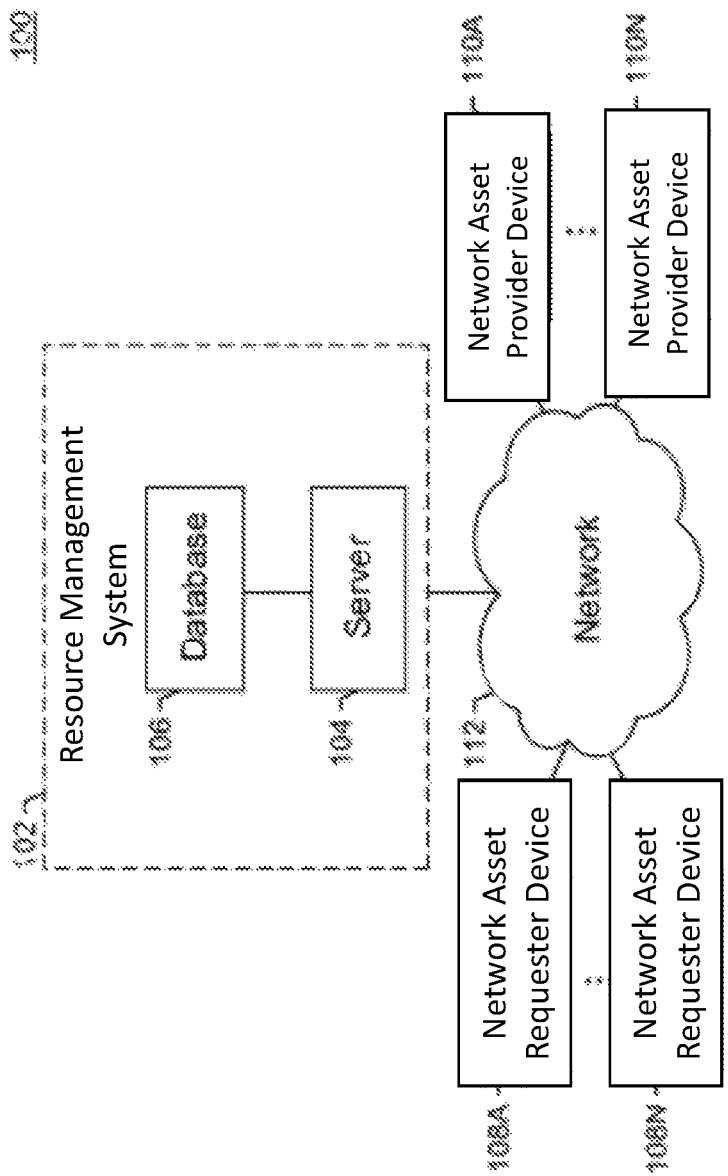
Figure 2:
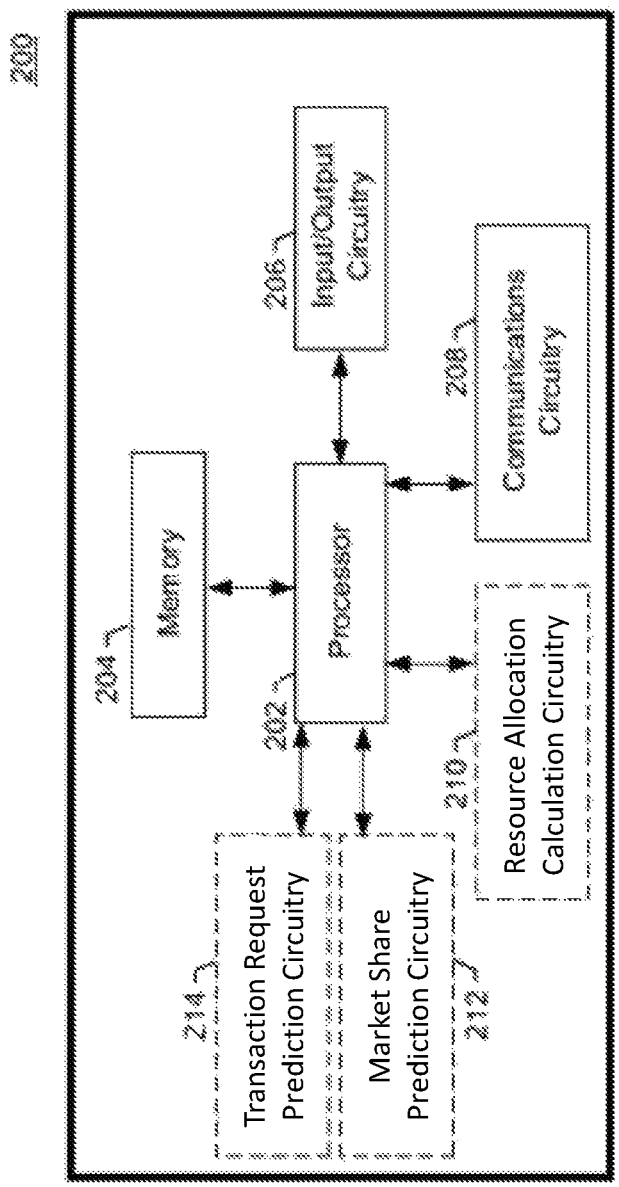
Figure 3:
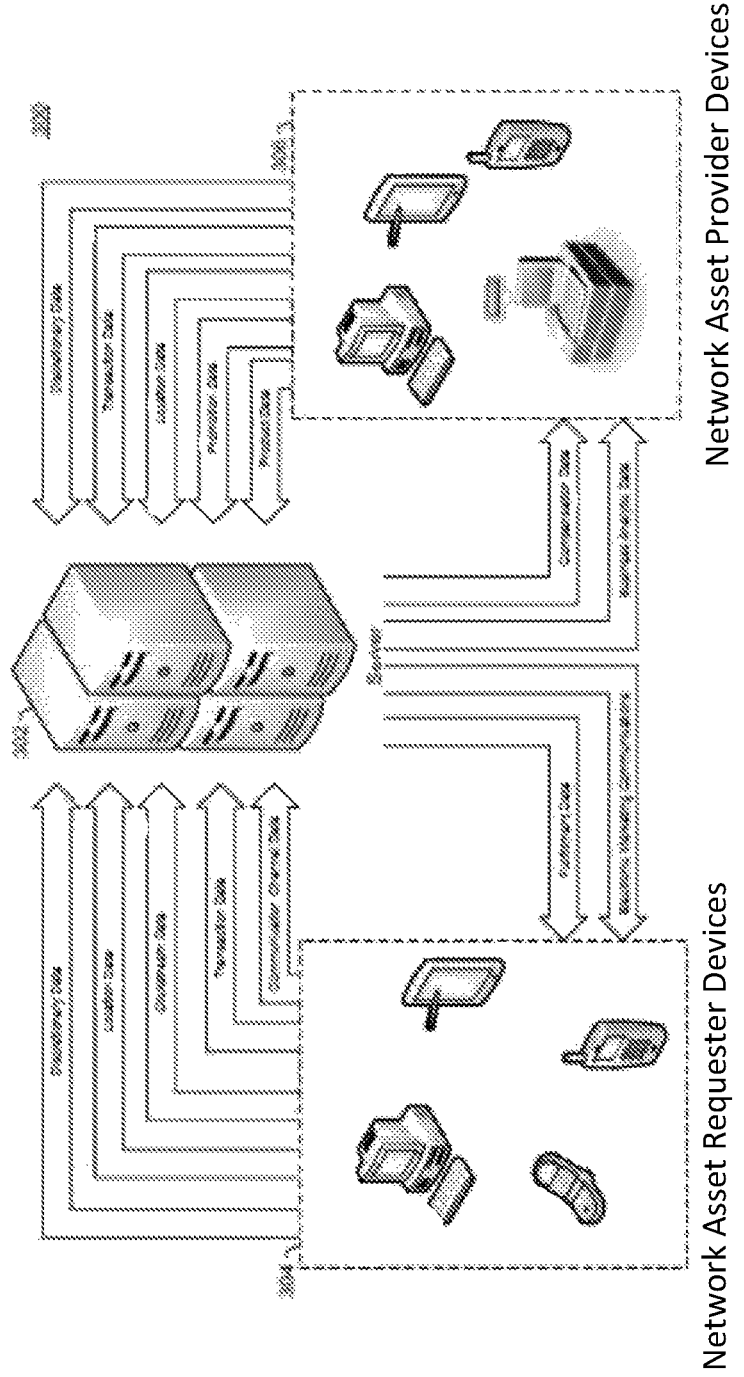
Figure 4:
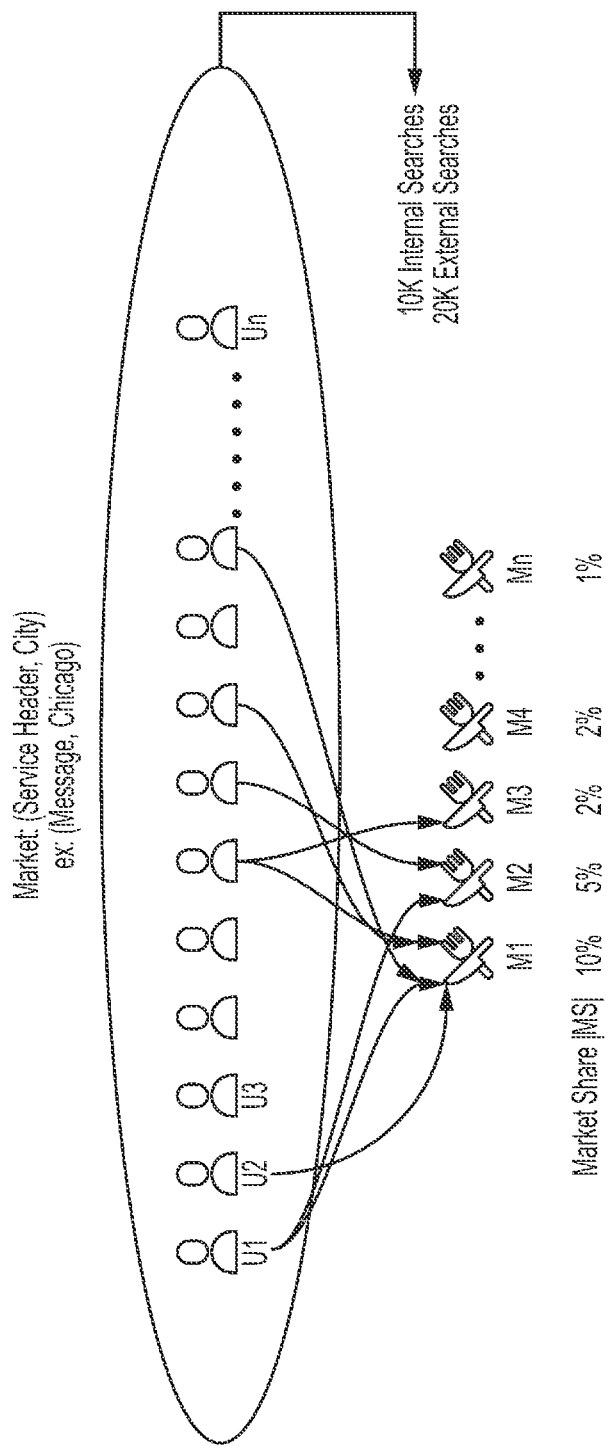

Having thus described the invention in general terms, reference will now be made to the accompanying drawings, which are not necessarily drawn to scale, and wherein:

FIG. 1 is an overview of a resource demand balancing system that can be used to practice embodiments of the present invention;

FIG. 2 is an exemplary schematic diagram of a resource demand balancing server entity according to one embodiment of the present invention;

FIG. 3 is an exemplary data flow illustrating interactions between a resource demand balancing server, one or more network asset requester devices, and one or more network asset provider devices;

FIG. 4 is an exemplary network demand value generation overview according to an exemplary network asset provider group, for use with embodiments of the present invention.

Figure 5:
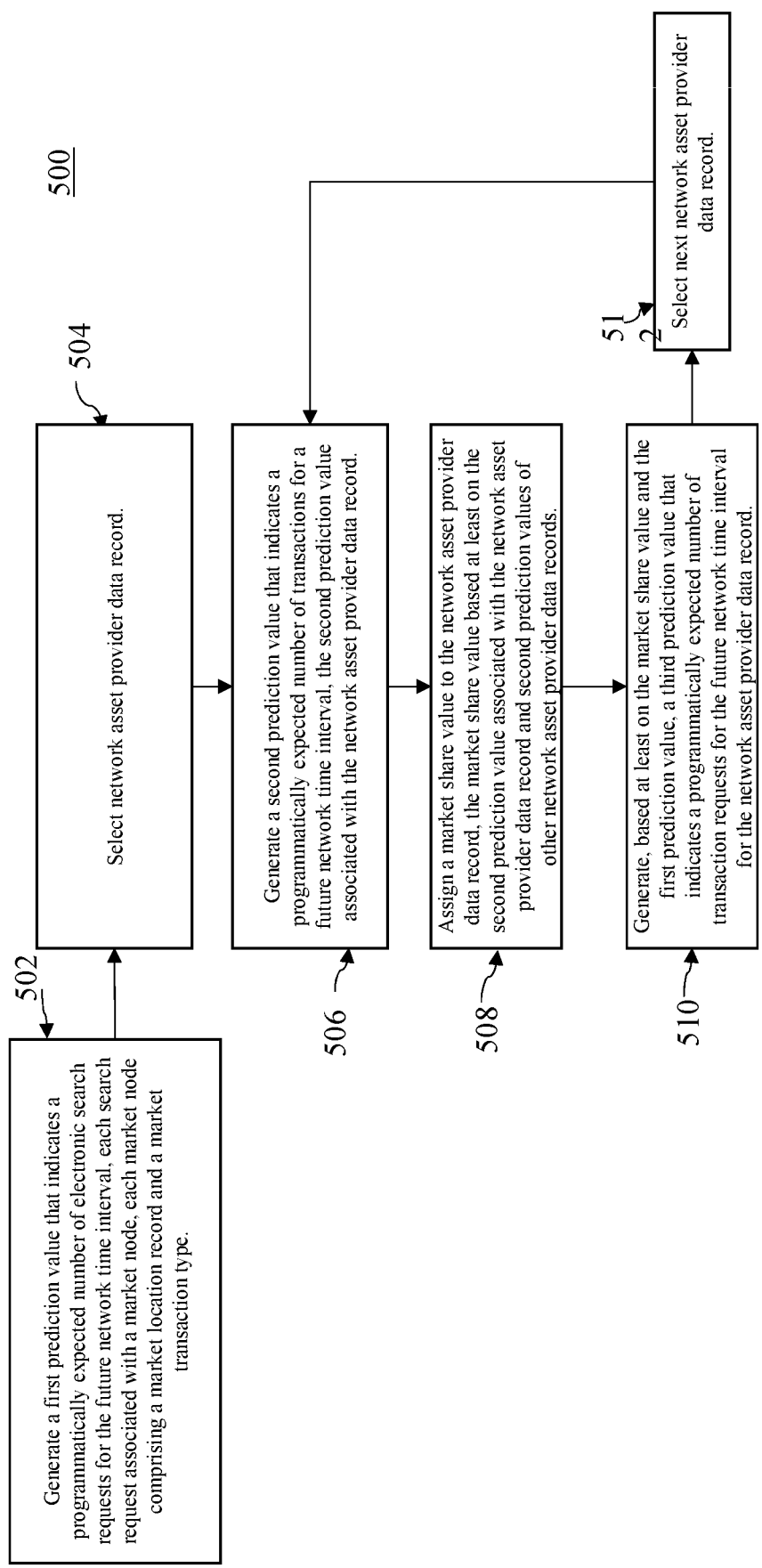
Figure 6:
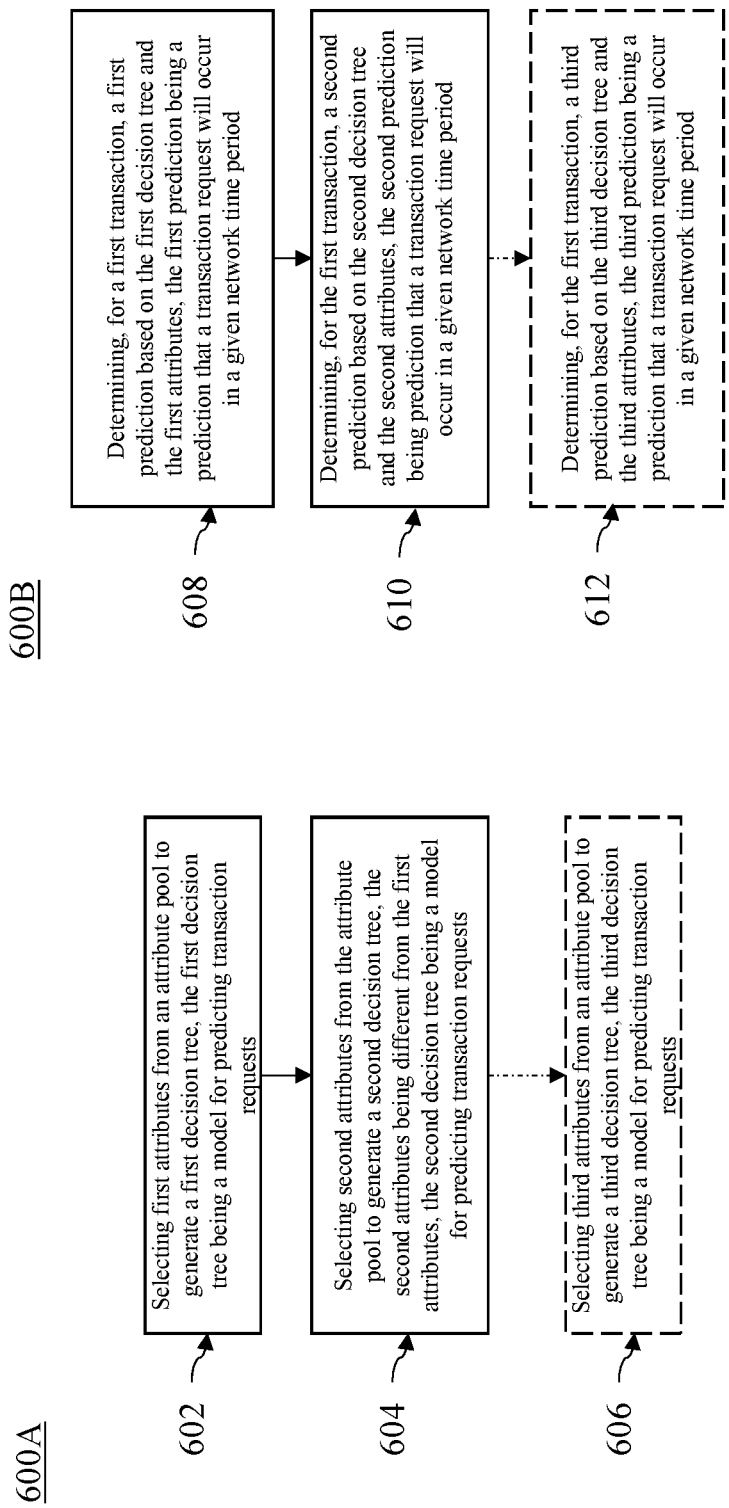
Figure 7:
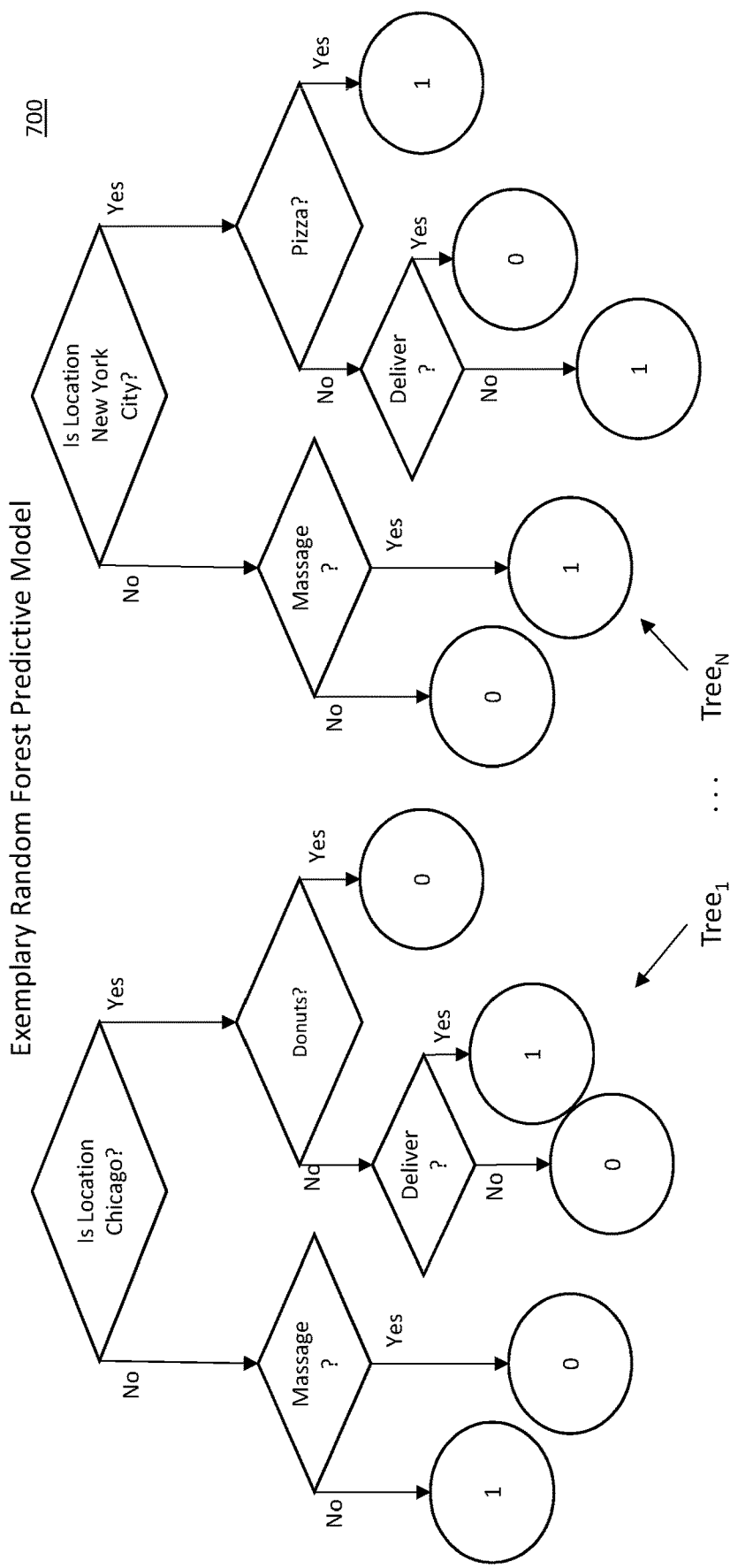

FIG. 5 is a flow chart illustrating a resource demand balancing procedure that may be completed in accordance with various embodiments of the present invention;

FIG. 6A is a flow chart illustrating a decision tree generation procedure that may be completed in accordance with various embodiments of the present invention;

FIG. 6B is a flow chart illustrating prediction determination procedures that may be completed in accordance with various embodiments of the present invention; and FIG. 7 illustrates an exemplary random forest model that may be used in accordance with various embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention generally relate to transaction request prediction based on a machine learning model.

In one example, a resource management system may supply a data set to a learning machine or algorithm. The learning machine or algorithm may then determine which features or attributes associated with transactions from a past network time interval correlate to a high likelihood that a future transaction request will occur in a given network period and which features or attributes correlate to a low likelihood. Accordingly, the learning machine may select a subset of features or attributes for training. Once the learning machine or algorithm is trained, live data associated with a new transaction may be input and the learning machine or algorithm may then classify the transaction as having a high likelihood of resulting in future transaction requests in a given network period or not. As such, the system may allocate necessary resources for a future network period.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "resource demand balancing system" may include a system that is accessible via one or more computing devices and that is operable to transmit data comprising executable instructions that, when executed on a computing device, can render a device rendered object or network asset for display by the device. The resource demand balancing system may predict network asset requests for a future network time interval so that resource demand is balanced across network asset providers associated with the system.

As used herein, the term "network asset provider" may be used to refer to a network actor capable of providing a network asset to another computing device. A network asset may be a set of instructions that, when executed by a computing device, renders an instrument redeemable for a network asset. An example of a network asset provider may be a provider or a merchant. In embodiments, the terms "merchant" and "network asset provider" may be used interchangeably.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provide," or "merchant" need not actually market a product or service via the promotion and marketing service, as some merchants or providers may utilize the promotion and marketing service only for the purpose of gathering marketing information, demographic information, or the like.

As used herein, the term "network asset requester" may be used to refer to a requester for network assets that may be purchased, consumed, or redeemed by the network asset requester. Examples of a network asset requester may include a consumer.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the terms "network asset" and "device rendered object" may be used interchangeably to mean an electronic representation of or an instrument redeemable for a digital promotion or marketing service provided by one or more providers that are offering one or more instruments that are redeemable for goods, services, experiences and/or the like. In some examples, the system may take the form of a server enabling transactions related to redemption of promotions associated with device rendered objects, processing of financial transactions associated with device rendered objects, and/or the like. As such, the system is, in some example embodiments, configured to present one or more device rendered objects that display promotions via one or more impressions, accept payments for promotions from consumers, issue instruments upon acceptance of an offer or a promotion, participate in redemption, generate rewards, provide a point of sale device or service, issue payments to providers and/or otherwise participate in the exchange of goods, services or experiences for currency, value and/or the like. The system is also, in some example embodiments, configured to enabling object parameter analysis, whereby parameters associated with device rendered objects can be optimally selected, including parameter analytics, and the like. Examples of device rendered objects or network assets may include promotions or deals.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a device rendered object that includes instructions to cause the rendering at a computing device of a promotion offered by the system for a digital instrument redeemable for a $50 meal promotion for a transaction value of $25 at a particular restaurant. In this example, $25 would be the transaction value and an associated digital amount is debited from a data store associated with a device initiating the transaction. A consumer associated with the device initiating the transaction would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like, which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via the system. Transaction data may also include information relating to the transaction. For example, transaction data may include a timestamp, consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a network asset requester (e.g., consumer), a network asset provider (e.g., merchant), or any other entity capable of interaction with the promotion and marketing service. For example, in some embodiments location data is provided by a location services module of a network asset requester device. In some embodiments, location data may be provided by a network asset provider indicating the location of network asset providers within their retail location. In some embodiments, location data may be provided by network asset providers to indicate the current location of the network asset provider (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems. Throughout this specification, the terms "user device," "network asset provider," and "consumer device" may be used interchangeably.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, it should be appreciated that the examples of discretionary data provided above may also be determined implicitly or through review or analysis of other electronic marketing information provided to the promotion and marketing service. It should also be appreciated that the promotion and marketing service may also grant access to certain features or tools based on whether certain discretionary data has been provided. For example, the consumer may be required to provide information relating to their interests or location during a registration process.

As used herein, the term "electronic communication" refers to any electronically generated information content provided by the promotion and marketing service to a consumer for the purpose of marketing a promotion, good, or service to the consumer. Electronic marketing communications may include any email, short message service (SMS) message, web page, application interface, or the like, electronically generated for the purpose of attempting to sell or raise awareness of a product, service, promotion, or merchant to the consumer.

It should be appreciated that the term "electronic communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

It will be appreciated that network assets, device rendered objects, network asset providers, and the like, as described herein, may have associated therewith one or more attributes.

It should be understood that each of the attributes discussed in this application, may be in some embodiments, may be a primary or a secondary attribute. A list of exemplary attributes is provided below. It will be appreciated that network asset group location, group network asset type, network asset location, and asset type can be considered attributes. It will also be appreciated that a network asset provider record and a network asset provider group may comprise additional attributes. Further, network asset search requests and network asset requests may be associated with one or more attributes.

In some implementations, one attribute may represent category data, specifically beauty, wellness and healthcare. To determine a normalized value of the one attribute, an algorithm may be executed on associated raw data related to a transaction. For example, if the category data associated with a promotion transaction is "beauty, wellness and healthcare," the value of the one attribute is 1. If the category data associated with a transaction is not "beauty, wellness and healthcare," the value of the one attribute is 0.

In some embodiments, a number of example attributes relate to category data and sub-category data. There is also a number of attributes related to location data. It should be understood that attribute data related to location and hyper location data may be generated in a similar fashion. For example, if the location data associated with a transaction is "Chicago," the value of a corresponding attribute may be 1. If the category data associated with a transaction is not "Chicago," the value of the corresponding attribute may be 0.

It should also be understood that transactions may have associated data indicating one or more categories, sub-categories, location, hyper-locations, prices or the like. For example, a transaction may be associated with a gym, and the gym may be associated with category data such as "beauty, wellness, and healthcare," "Food and drink," "Leisure Offers and Activities" and/or "Services." A gym may also have more than one location, and may be able to provide promotions in a variety of price ranges and time frames.

Example attribute data can also be associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider of a transaction. For example, promotion transactions purchased from providers from different locations (e.g., different countries, states, neighborhoods or the like) may be associated with different attribute data. For example, different countries have different credit reporting rules and agencies. Thus, a system may utilize a first combination of attributes for a transaction from a provider in a first location, hyper-location, category or sub-category and a second combination of attributes for a transaction from provider in a second location, hyper-location, category or sub-category.

In one implementation, other attribute data may be used. For example, attribute "bad month" may relate to identifying transactions having attributes associated with network time intervals (e.g., booking months) where prior transactions have involved products, services, and/or other offerings in one or more categories categorized as having high termination transaction rates based on prior performance data. The feature may be normalized such that if the sub-category of the promotion transaction is associated with high return rates, the attribute is 1, else the attribute is 0. Other example attributes are "bad market," which may be normalized such that if the transaction has an attribute associated with GPS coordinates that indicate a significant distance requiring travel to a location and/or hyper local region associated with high return rates, the attribute is 1, else the attribute is 0. Another example feature is "average price for sub-category."

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to promotion transaction associated with a merchant providing a service, attributes specifying past performance data can be for (1) the same merchant and the same service, (2) only the same merchant, (3) only the same service may be clustered under attribute header "past performance."

Table A shows example attributes.

TABLE A

| Type | Features |
|---|---|
| Location | division, distance to city, etc. |
| past performance | same merchant & service, same service, same merchant, etc. |
| category & service | service header, primary deal service, etc. |
| booking month | holiday, pre-holiday, etc. |
| maximum capacity | units_avail, etc. |
| hero score | predicted 30 day bookings, predicted 60 day bookings, etc. |
| review data | yelp_n_review, yelp_rating, yelp_avil, google_n_review, facebook_fans, etc. |

The clustered or the non-clustered attributes may be used to train a machine learning model. It should be understood that the selection of attributes or clusters of attributes for training machine learning models or for promotion termination prediction processes can greatly affect the respective performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

In some implementations, the prediction processes disclosed herein are performed according to a random forest model. The model may operate by constructing multiple decision trees at training. Each decision tree may be based on different attributes. In some implementations, the random forest model output is the mode of classes or the most occurring class among all the trees of the random forest. In some implementations, the random forest model is trained with historical data associated with various attributes. In some implementations, different trained models may be utilized for different locations and/or types of promotion transactions.

As used herein, the term "likelihood" refers to a measure of probability for occurrence of a particular event. For example, the likelihood that a customer is satisfied with a promotion may be a value associated with a specific scale. In some implementations, the machine predictions discussed above are based, at least in part, on the "likelihood" that an event will occur. Similarly, in some implementations, machine predictions are based on attributes associated with a merchant and an associated merchant promotion.

As used herein, the term "network time interval" refers to a duration of time between a first and second network timestamp. A network time interval may be from a past duration of time, a current duration of time, or a future duration of time. Examples of network time intervals may include one hour, one day, one week, one month, one year, and the like.

As used herein, the term "network asset provider group" refers to a grouping or node of network asset providers. A network asset provider group may be associated with a particular location, referred to herein as a "group location." A network asset provider group may be associated with a particular network provider asset type, where a network provider asset type can be a type of asset, transaction, or promotion offered by the network asset provider group.

As used herein the term "network asset provider record" refers to a data structure associated with a network asset provider. The data structure may comprise a location, referred to as a network asset provider location. The data structure may further comprise a network asset type, where the network asset can be a type of asset, transaction, or promotion offered by the network asset provider.

As used herein, the term "network asset search request" refers to a query for network assets or device renderable objects submitted to a network demand balancing system or third party search engine by a network asset requester utilizing a network asset requesting device.

As used herein, the term "network asset request" refers to a query for transactions available for network assets or device renderable objects submitted to a network demand balancing system by a network asset requester utilizing a network asset requesting device. In some embodiments, the network asset request results in a transaction performed whereby a network asset or device rendered object is transferred to the network asset requester device.

As used herein, the term "network demand value" refers to a measure of a network asset demand associated with a network asset provider in relation to the total network asset demand of all network asset providers of the network asset provider group. One example of network demand value may be market share.

As used herein, the term "demand" refers to service/merchandise promotional offers that are desired by consumers or network asset requesters. Demand can be based upon data provided from within the network resource demand balancing system or from third party data or both.

A representation of market share is provided by using the Herfindahl-Hirschman index (HHI) instead. The Herfindahl-Hirschman index (HHI) is a commonly accepted measure of market concentration. It is calculated by squaring the market share of each firm competing in a market, and then summing the resulting numbers, and can range from close to zero to 10,000. The U.S. Department of Justice uses the HHI for evaluating potential mergers issues.

The closer a market is to being a monopoly, the higher the market's concentration (and the lower its competition). If, for example, there were only one firm in an industry, that firm would have 100% market share, and the HHI would equal 10,000, indicating a monopoly. If, there were thousands of firms competing, each would have nearly 0% market share, and the HHI would be close to zero, indicating nearly perfect competition.

The U.S. Department of Justice considers a market with an HHI of less than 1,500 to be a competitive marketplace, an HHI of 1,500 to 2,500 to be a moderately concentrated marketplace, and an HHI of 2,500 or greater to be a highly concentrated marketplace.

The HHI of a market is calculated by taking the market share of each firm in the industry, squaring them, and summing the result:

$$HHI = s1^2 + s2^2 + s3^2 + \ldots + sn^2 \text{ (where } s \text{ is the market share of the each firm expressed as a whole number, not a decimal).}$$

Consider the following hypothetical industry with four total firms:

Firm one market share=40%; Firm two market share=30%; Firm two market share=15%; Firm two market share=15%.

The HHI is calculated as:

$$HHI = 40^2 + 30^2 + 15^2 + 15^2 = 1,600 + 900 + 225 + 225 = 2,950.$$

According to the U.S. Department of Justice, this would be considered a highly concentrated industry, as expected since there are only four firms. But the number of firms in an industry does not necessarily indicate anything about market concentration, which is why calculating the HHI is important. For example, assume an industry has 20 firms. Firm one has a market share of 48.59% and each of the 19 remaining firms have a market share of 2.71% each. The HHI would be exactly 2,500, indicating a highly concentrated market. If firm number one had a market share of 35.82% and each of the remaining firms had 3.38% market share, the HHI would be exactly 1,500, indicating a competitive market place.

For the purposes of the present disclosure, a market or network asset provider group that is considered highly competitive can also be considered unconcentrated. This is because a market or network asset provider group that is highly competitive occurs when all of the firms or merchants (or network asset providers) in the market (or network asset provider group) have approximately equal market share (or network demand).

As used herein, the term "system-wide network resource allocation" may be used to refer to an aggregation of network resources that is allocated to be available for fulfillment of predicted network asset requests.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an exemplary resource demand balancing system or resource management system within which embodiments of the present invention may operate. Network computing devices may access a resource demand balancing system 102 via a network 112 (e.g., the Internet, or the like) using computer devices 108A through 108N and 110A through 110N, respectively (e.g., one or more network asset requester devices 108A-108N or one or more network asset provider devices 110A-110N). Moreover, the resource demand balancing system 102 may comprise a server 104 in communication with a database 106.

The server 104 may be embodied as a computer or computers as known in the art. The server 104 may provide for receiving of electronic data from various sources, including but not necessarily limited to the network asset requester devices 108A-108N and the network asset provider devices 110A-110N. For example, the server 104 may be operable to receive and process clickstream data provided by the network asset requester devices 108 and/or the network asset provider devices 110. The server 104 may also facilitate e-commerce or other transactions based on transaction information provided by the network asset requester devices 108 and/or the network asset provider devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the resource demand balancing system 102. For example, the database 106 may include, without limitation, user account credentials for system administrators, merchants, and consumers, data indicating the device rendered objects transmittable by the resource demand balancing system, clickstream data, analytic results, reports, financial data, and/or the like.

The network asset requester devices 108A-108N may be any computing device as known in the art and operated by a consumer or network asset requester. Electronic data received by the server 104 from the network asset requester devices 108A-108N may be provided in various forms and via various methods. For example, the network asset requester devices 108A-108N may include desktop computers, laptop computers, smartphones, netbooks, tablet computers, wearables, and the like. The information may be provided through various sources on these network asset requester devices.

In embodiments where a network asset requester device 108 is a mobile device, such as a smart phone or tablet, the network asset requester device 108 may execute an application or "app" to interact with the resource demand balancing system 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The resource demand balancing system 102 may leverage the application framework offered by the mobile operating system to allow network asset requesters to designate which information is provided to the app and which may then be provided to the resource demand balancing system 102. In some embodiments, network asset requesters may "opt in" to provide particular data to the resource demand balancing system 102 in exchange for a benefit, such as improved relevancy of communications offered to the network asset requester device. In some embodiments, the network asset requester device may be provided with privacy information and other terms and conditions related to the information provided to the resource demand balancing system 102 during installation or use of the app. Once the network asset requester provides access to a particular feature of the mobile device, information derived from that feature may be provided to the resource demand balancing system 102 to improve the quality of the network asset requester's interactions with the resource demand balancing system 102.

For example, the network asset requester (e.g., consumer) may indicate that they wish to provide location information to the app from location services circuitry included in their mobile device. Providing this information to the resource demand balancing system 102 may enable the resource demand balancing system 102 to transmit instructs for rendering device rendered objects that display promotions or network assets to the network asset requester device that are relevant to the particular location, e.g., GPS coordinates, of the network asset requester device (e.g., by providing device rendered objects for displaying network assets for network asset providers proximate to the network asset requesters device's current location). It should be appreciated that the various mobile device operating systems may provide the ability to regulate the information provided to the app associated with the resource demand balancing system 102. For example, the network asset requester (e.g., consumer) may decide at a later point to disable the ability of the app to access the location services circuitry, thus limiting the access of the network asset requester device's location information to the resource demand balancing system 102.

Additionally or alternatively, the network asset requester device 108 may interact through the resource demand balancing system 102 via a web browser. As yet another example, the network asset requester device 108 may include various hardware or firmware designed to interface with the resource demand balancing system 102 (e.g., where the network asset requester device 108 is a purpose-built device offered for the primary purpose of communicating with the resource demand balancing system 102, such as a store kiosk).

The network asset provider devices 110A-110N may be any computing device as known in the art and operated by a network asset provider. For example, the network asset provider devices 110A-110N may include a network asset provider point-of-sale, a network asset provider e-commerce server, a network asset provider inventory system, or a computing device accessing a web site designed to provide network asset provider access (e.g., by accessing a web page via a browser using a set of network asset provider account credentials). Electronic data received by the resource demand balancing system 102 from the network asset provider devices 110A-110N may also be provided in various forms and via various methods. For example, the network asset provider devices 110A-110N may provide real-time transaction and/or inventory information as transactions are completed by the network asset provider. In other embodiments, the network asset provider devices 110A-110N may be employed to provide information to the resource demand balancing system 102 to enable the resource demand balancing system 102 to generate instructions for objects renderable to display assets, promotions or other marketing information to be transmitted to network asset requester device.

An example of a data flow for exchanging electronic information among one or more network asset requester devices, network asset provider devices, and the resource demand balancing system is described below with respect to FIG. 3.

Example Apparatus for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, network asset request prediction circuitry 210, network demand value assignment/prediction circuitry 212, and network asset search request prediction circuitry 214. The apparatus 200 may be configured to execute the operations described above with respect to FIG. 1 and below with respect to FIGS. 3-7. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Network asset request prediction circuitry 210 includes hardware configured to programmatically generate a volume of network asset requests for a future network time interval. The network asset request prediction circuitry 210 may utilize processing circuitry, such as the processor 202, to perform these actions. The network asset request prediction circuitry 210 may receive data from network demand value assignment/prediction circuitry 212. In some implementations, the received data may be a normalized score indicative of a probability that a network asset provider will receive demand for completing transactions involving transfer of network assets. However, it should also be appreciated that, in some embodiments, the network asset request prediction circuitry 210 may include a separate processor, specially configured field programmable gate array (FPGA), or application specific interface circuit (ASIC) to classify, update request predictions, and train and use a machine learning model for request predictions. In some implementations, network demand value assignment/prediction circuitry 212, described below, may be sub-circuitry belonging to network asset request prediction circuitry 210. The network asset request prediction circuitry 210 may be implemented using hardware components of the apparatus configured by either hardware or software for implementing these planned functions.

Network demand value assignment/prediction circuitry 212 includes hardware configured to identify and determine a prediction of network demand for a particular network asset provider in a given network time interval. In some implementations, the prediction is specified as a probability or likelihood that the network asset provider will receive demand for completing transactions involving transfer of network assets in the future network period. The network demand value assignment/prediction circuitry 212 may utilize processing circuitry, such as the processor 202, to perform these actions. However, it should also be appreciated that, in some embodiments, the network demand value assignment/prediction circuitry 212 may include a separate processor, specially configured field programmable gate array (FPGA), or application specific interface circuit (ASIC) for determining a prediction specifying a likelihood that the network asset provider will receive demand for completing transaction requests. Similarly, network asset search request prediction circuitry 214 includes hardware configured to identify and determine a prediction of searches for network assets that will occur in a future network time interval. Such prediction may also be specified as a numerical value. Again, it should also be appreciated that, in some embodiments, the network asset search request prediction circuitry 214 may include a separate processor, specially configured field programmable gate array (FPGA), or application specific interface circuit (ASIC) for calculating a historical asset search request rate. Circuitry 212 and 214 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Resource Demand Balancing System Data Flow

FIG. 3 depicts an example data flow 300 illustrating interactions between a resource demand balancing server 302, one or more network asset requester devices 304, and one or more network asset provider devices 306. The resource demand balancing server 302 may be implemented in the same or a similar fashion as the server 104 as described above with respect to FIG. 1, the one or more network asset requester devices 304 may be implemented in the same or a similar fashion as the network asset requester devices 108A-108N as described above with respect to FIG. 1, and the one or more network asset provider devices 306 may be implemented in the same or a similar fashion as the network asset provider devices 110A-110N as described above with respect to FIG. 1.

The data flow 300 illustrates how electronic information may be passed among various systems when employing a resource demand balancing server 302 in accordance with embodiments of the present invention. The one or more network asset requester devices 304 and/or one or more network asset provider devices 306 may provide a variety of electronic information to the server 302 for use in providing network assets to the network asset requester. This electronic information may include, but is not limited to, location data, clickstream data, transaction data, communication channel data, historical data, review data and/or discretionary data.

As a result of transactions performed between the one or more network asset requester devices 304 and the resource demand balancing server 302, the resource demand balancing server 302 may provide fulfillment data to the network asset requester devices. The fulfillment data may include information indicating whether the transaction was successful, the location and time the asset will be provided to the network asset requester device, instruments for redeeming assets purchased by the network asset requester, or the like.

In addition to the interactions with the one or more network asset requester devices 304 offered by the resource demand balancing server 302, the resource demand balancing server 302 may leverage information provided by the network asset requester devices to improve the relevancy of communications to individual network asset requesters or groups of requesters. In this manner, the resource demand balancing server 302 may determine assets (e.g., promotions, goods, and services) that are more likely to be of interest to a particular network asset requester or group of requesters based on clickstream data, location data, and other information provided by and/or relating to particular requesters. For example, the resource demand balancing server 302 may detect the location of a requester based on location data provided by the network asset requester device, and offer assets (e.g., promotions) based on the proximity of the network asset requester to the network asset provider associated with those assets.

The resource demand balancing server 302 interactions with the one or more network asset provider devices 306 may be related to enabling the network asset provider to market their assets. For example, the one or more network asset provider devices 306 may provide asset data defining one or more assets (e.g., promotions) to be offered by a promotion and marketing service of the resource demand balancing system on behalf of the network asset provider. The resource demand balancing server 302 may receive this information and generate information for providing such assets via an interface, making the assets available for purchase or other consumption by network asset requestors. In embodiments, an example of a resource management system is a promotion and marketing service.

Embodiments advantageously provide for improvements to the server by allowing prediction of network asset requests more efficiently and accurately. Improvements to the server also include more accurately predicting network demand for particular network asset providers. In turn, this reduces the server stress. For example, by eliminating unnecessary reuse of global variables throughout iterations, the server reduces the processing associated with predicting required system resource volumes to fulfill network asset requests in a given future network period. In turn, the processing power requirement of the server is significantly reduced.

Example Processes for Network Asset Request Predictions Based on Asset Search Request Prediction and Network Demand Value Assignment/Prediction As described, a system may utilize network communications to deliver device rendered objects representing network assets to remote computing devices.

In order to maintain accurate data stores associated with network asset provider records, the system must have an available volume of network system resources or assets. Demand for network assets can be predicted based upon historical network asset search requests in addition to network demand values associated with network asset providers.

Naturally, the ability to accurately predict network asset requests can significantly impact server processing power and time. Accordingly, there exists a dire market need for methods and systems that can accurately predict network asset requests that must be fulfilled by network asset providers.

Network asset providers, or merchants, in specific network asset provider groups, or market nodes, have a share or portion of the network demand (e.g., market share), therefore required system resources or network assets vary with different levels of network demand. Providing an accurate measure of network demand is important for accurately predicting required network asset volumes.

FIG. 4 is an exemplary network demand value generation overview according to an exemplary network asset provider group, for use with embodiments of the present invention. FIG. 4 provides a graphical representation of a network asset provider group having network demand value (MS) divided across multiple network asset providers, or merchants, (e.g., M1, M2, M3, M4, . . . Mx). An example of a network asset provider group is all of the network asset providers providing massage redemption objects in the city of Chicago. In this example, the network asset type is massage services, and the group location is Chicago. In the example presented in FIG. 4, merchant M1 has 10% of the market share, M2 has 5%, M3 has 2%, M4 has 2% and Mx has 1%. In this scenario, the sum of all of the market shares (or network demand values) across the market (or network asset provider group) will be equal to 100%.

Demand for products or services can be derived from a number of search request transactions that are performed involving the same transaction type and location as existing records. The number of search request transactions can be limited to occurring during a defined network time interval.

FIG. 5 is a flow chart of an example process 500 for balancing resource demand in accordance with embodiments of the present invention. The process 500 begins with generating a first prediction value that indicates a programmatically expected number of network asset search requests for a future network time interval (502). In some implementations, each network asset search request is associated with a network asset provider group. In some implementations, each network asset provider group is associated with a group location and a group network asset type. In some embodiments, the network asset search requests are requests for device rendered objects. In some embodiments, the device rendered object is a set of instructions that, when executed by a network asset requesting device (e.g., consumer computing device), enables an electronic display interface that represents a promotional asset offered by a network asset provider. In some implementations, the promotional asset may be an instrument redeemable for any goods offered by a department store. In some implementations, the promotional asset may be an instrument redeemable for a specific type of goods offered by the department store (e.g., camping equipment). In some implementations, the promotional asset may be an instrument redeemable for a specific item, such as, a bike. Similarly, the promotional asset may be an instrument redeemable for services offered by a service store, where the service store may request transmittal of promotion for services provided by the store (e.g., haircut, hair coloring, oil change). In some implementations, stores may offer a combination of services and goods.

The process 500 continues with selecting a network asset provider record (504) from a plurality of network asset provider records. In some embodiments, a network asset provider record comprises a network asset provider location and a network asset type.

The process 500 may continue with generating a second prediction value that indicates a programmatically expected number of network asset transactions for a future network time interval (506). In some embodiments, the network asset transactions involve transfer of device rendered objects as described above.

The process 500 continues with assigning a network demand value to network asset provider record (508). In some embodiments, the network demand value is based at least on the second prediction value of the network asset provider record and second prediction values of the other network asset provider records of the plurality of network asset provider records. For example, a network demand value can be a ratio of the second prediction value of the network asset provider record to the sum of all second prediction values for all network asset provider records of the plurality of network asset provider records.

The process 500 continues with generating a third prediction value that indicates a programmatically expected number of network asset requests for the future network time interval for each network asset provider record (510). In some embodiments, the third prediction value is determined based at least on the network demand value and the first prediction value. The process 500 continues with a next programmatically expected number of network search requests is converted to a number of required system resources or network assets.

In some embodiments, network asset provider records are ranked according to one or more of the first prediction value and the third prediction value. In some embodiments, additional weight can be given, when ranking network asset provider records, to network asset providers with higher income records that are associated with network asset provider groups that are classified as highly competitive.

Table 1 below illustrates an example ranking of network asset provider records that are associated with the same network asset provider group and the network asset provider group is classified as unconcentrated. In this example, the rankings of the network asset provider records do not change whether the first prediction value is used or the third prediction value. In some embodiments, demand for future network asset transactions is distributed across the network asset provider records according to the network asset provider's network demand value; essentially weighting network asset provider records according to their network asset supply capabilities.

TABLE 1

| #Network Asset Provider | First Prediction Value | Network Demand Value | Third Prediction Value | (Network Demand Value)^2 |
|---|---|---|---|---|
| M1 | 395 | 13.3% | 223 | 176 |
| M2 | 357 | 12.0% | 202 | 144 |
| M3 | 336 | 11.3% | 190 | 128 |
| M4 | 332 | 11.2% | 188 | 125 |
| M5 | 310 | 10.4% | 175 | 108 |
| M6 | 304 | 10.2% | 172 | 104 |
| M7 | 304 | 10.2% | 172 | 104 |
| M8 | 276 | 9.3% | 156 | 86 |
| M9 | 273 | 9.2% | 154 | 84 |
| M10 | 89 | 3.0% | 50 | 9 |

Table 2 below illustrates an example of network asset providers across different network asset provider groups. Table 2 shows that the rankings of the network asset provider records change whether the first prediction value is used or the third prediction value.

TABLE 2

| Network Asset Provider Group | Network Asset Provider | First Prediction Value | Network Demand Value | HHI | Third Prediction Value | Network Asset Provider Group Type |
|---|---|---|---|---|---|---|
| MK2 | $M_{1,2}$ | 9,884 | 1.72 | 3 | 27,343 | Highly Competitive |
| MK1 | $M_{1,1}$ | 395 | 13.28 | 176 | 22,346 | Unconcentrated |
| MK2 | $M_{2,2}$ | 8,706 | 1.51 | 2 | 21,213 | Highly Competitive |
| MK1 | $M_{2,1}$ | 357 | 11.98 | 144 | 20,168 | Unconcentrated |
| MK2 | $M_{3,2}$ | 8,349 | 1.45 | 2 | 19,509 | Highly Competitive |
| MK1 | $M_{3,1}$ | 336 | 11.29 | 128 | 19,008 | Unconcentrated |
| MK2 | $M_{4,2}$ | 8,197 | 1.43 | 2 | 18,805 | Highly Competitive | network asset provider record (512) until all network asset provider records have been processed.

In some embodiments, the process 500 may predict using one or more decision trees, based at least on the network demand value and the first prediction value, a programmatically expected number of network asset requests that will result for a particular network asset provider record in a given network time interval. In some implementations, the In some embodiments, the HHI is used as a multiplier in highly competitive markets (or network asset provider groups). For example, the third prediction value can be based on the HHI and first prediction value.

In some embodiments, network asset provider groups can be ranked in addition to network provider asset records. Table 3 below illustrates an example of ranked network asset provider groups.

TABLE 3

| City (Location) | Service Header (Asset Type) | #Searches | #Total HS | #GM | #Leads | Group Type |
|---|---|---|---|---|---|---|
| south-boston | Seafood | 2,776 | 196,795 | 2 | 54 | Unconcentrated |
| Wichita | Bakery & Desserts | 1,208 | 15,327 | 1 | 38 | Unconcentrated |
| boston | Seafood | 2,750+ | 176,630 | 1 | 50 | Unconcentrated |
| chicago | Parks | 17,618 | 94,117 | 5 | 44 | Unconcentrated |
| chicago | Subscriptions | 7,237 | 84,209 | 2 | 61 | Unconcentrated |
| columbus-oh | Steakhouse | 2,873 | 53,629 | 2 | 18 | Unconcentrated |
| minneapolis | Handyman & Contractors | 9,808 | 40,303 | 4 | 42 | Unconcentrated |
| las-vegas | New American Cuisine | 1,677 | 37,770 | 2 | 29 | Unconcentrated |
| long-beach | Steakhouse | 1,030 | 37,346 | 1 | 12 | Unconcentrated |
| long-beach | Seafood | 1,184 | 32,667 | 2 | 18 | Unconcentrated |
| los-angeles | Parks | 5,603 | 29,138 | 4 | 27 | Unconcentrated |
| tustin-ca | Traditional American Cuisine | 1,247 | 27,999 | 1 | 13 | Unconcentrated |
| san-diego | European Cuisine | 1,236 | 24,438 | 2 | 15 | Unconcentrated |
| philadelphia | Handyman & Contractors | 10,620 | 23,599 | 8 | 50 | Unconcentrated |
| atlanta | Italian Cuisine | 1,397 | 22,954 | 1 | 15 | Unconcentrated |
| charlotte | Handyman & Contractors | 7,407 | 22,170 | 9 | 55 | Unconcentrated |
| las-vegas | Climbing | 3,095 | 20,921 | 1 | 11 | Unconcentrated |
| providence | Bakery & Desserts | 1,066 | 20,289 | 3 | 21 | Unconcentrated |
| chicago | HVAC Services | 5,817 | 19,577 | 5 | 49 | Unconcentrated |

Example Prediction Processes

FIG. 6A is a flow chart of an example process 600A for training a network asset request prediction model based on selected attributes. The process 600A begins with selecting first attributes from an attribute pool to generate a first decision tree, the first decision tree being a model for predicting network asset requests (602). For example, the process 600a may select all "service type" attributes and the "location" attribute and/or other attributes or clusters of attributes. The selected first attributes are used to generate a decision tree for predicting a network asset request. In some implementations, the selection is based on a machine learning algorithm. In some implementations, the attributes are selected based on statistical analysis of past performances. In some implementations, the pool of attributes comprises one or more of the list of exemplary attributes above.

The process 600A continues with selecting second attributes from the attribute pool to generate a second decision tree, the second attributes being different from the first attributes and the second decision tree being a model for predicting network asset requests (604). The second attributes are selected in a manner similar to step 602. In some implementations, the second attributes are different from the first attributes. The selected second attributes are then used to generate a second decision tree.

In some implementations, the process 600A continues with optional step 606 shown in phantom. The process 600A may select third attributes from an attribute pool to generate a third decision tree, the third decision tree being a model for predicting network asset requests (606). In some implementations, the third attributes are different from the first and second attributes. In some implementations, the third attributes are then used to generate a decision tree. In some implementations, each generated tree is unique. In some implementations, additional trees are generated based on other selections of attributes. In some implementations, the process 600A may generate trees based on unique attribute selections until a threshold number of trees are generated. In some implementations, the process 600A may generate trees based on unique attribute selections until the model is stable and accurate.

FIG. 6B is a flow chart of an example process 600B for predicting network asset requests, according to a model trained based on selected attributes. The process 600B begins with determining, for a first transaction, a first prediction based on the first decision tree and the first attributes, the first prediction being a prediction that a network asset request will occur during a given network time period (608). For example, the process 600B may determine a first prediction based on the "service type" attributes and the "location" attribute and/or other attributes or clusters of attributes.

The process 600B continues with determining, for the first transaction, a second prediction based on the second decision tree and the second attributes, the second prediction being a prediction that a network asset request will occur during a given network time period (610).

In some implementations, the process 600B includes optional step 612 shown in phantom. The process 600B may determine, for a first transaction, a third prediction based on the third decision tree and the third attributes, the third prediction being a prediction that a network request will occur during a given network time period (612). In some embodiments, the third prediction is different from the first prediction.

It will be appreciated that, while FIGS. 6A, 6B, and 7 are directed in this description to predicting network asset requests, other predictions as described herein may be performed in a similar fashion without departing from the scope of the invention. Examples of additional prediction processes described herein that may be implemented in accordance with FIGS. 6A, 6B, and 7 include network asset search request predictions as well as network asset transaction predictions.

FIG. 7 illustrates an exemplary random forest model for use with the present system, according to one embodiment. The model includes features such as distance, the popularity of a category of service or product, whether the promotion relates to a service, whether the merchant has offered a promotion before, whether the type of promotion has a high history of refunds, and whether the product is available online.

The exemplary random forest 700 is composed of N trees, where N is a number. The prediction of the random forest is the average of the predictions from the N trees. The prediction from a tree is determined by a root node decision (e.g., location of service) and then traversing a logic path through the tree to a terminal leaf node based on the decision outcome determined at each successive node along the path. For example, in a model comprised of N trees where N is 5, the random forest prediction is the average of all of the trees. Based on a certain threshold, for example 0.5, the prediction is that a network asset request will ("1") or will not ("0") will occur in a future network time period. By way of further example, if a search request was for a location in Chicago and was for a massage, the network asset request may receive a score of "0." As another example, if the transaction request was for a location in New York City and is for pizza, the network asset request may receive a score of "1." The exemplary random forest 1300 prediction is the average of the respective predictions from trees 1, 2, 3, 4, and 5. In one example, tree 1 results in a score of "1," tree 2 results in a score of "0," tree 3 results in a score of "0," tree 4 results in a score of "0," and tree 5 results in a score of "1." The average of the scores is (1+1)/5 or 0.4. Assuming an exemplary threshold for a transaction is 0.5, (e.g., if the score is greater than or equal to 0.5, the network asset requests is considered likely to occur in the future network period), the network asset request in this example is considered not likely to occur in the future network period.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for predictively balancing network resource demand, the system comprising:
 a network resource demand balancing server coupled with a communication network, the network resource demand balancing server having a processor, the processor, when executing computer-readable instructions, is configured to:
  generate a first prediction value that indicates a programmatically expected number of network asset search requests for a future network time interval, each network asset search request associated with a network asset provider group, each network asset provider group associated with a group location and a group network asset type;
  select a network asset provider record that includes a network asset provider location and a network asset type; and
  generate a second prediction value for the network asset provider record that indicates a programmatically expected number of network asset transactions for the future network time interval.

2. The system of claim 1, wherein the first prediction value is based on a machine learning model.

3. The system of claim 2, wherein the machine learning model comprises a random forest model.

4. The system of claim 2, wherein the machine learning model is trained with historical data.

5. The system of claim 4, wherein the historical data comprises historical network asset search request data.

6. The system of claim 1, wherein the second prediction value is based on a machine learning model.

7. The system of claim 1, wherein each of the network asset provider location and the group location comprises GPS coordinates.

8. The system of claim 1, wherein a network asset search request is a request for a device rendered objects.

9. The system of claim 8, wherein each device rendered object comprises one or more object attributes and an object location.

10. The system of claim 9, wherein an object attribute of the one or more object attributes is an asset type.

11. The system of claim 10, wherein the object location comprises GPS coordinates.

12. The system of claim 1, wherein the processor is further configured to transmit device rendered objects to a remote network asset requester device based on the second prediction value.

13. An apparatus for predictively balancing network resource demand, the apparatus comprising at least one processor and at least one memory including computer program code, the at least one memory and the computer program code configured to, with the at least one processor, cause the apparatus to:
generate a first prediction value that indicates a programmatically expected number of network asset search requests for a future network time interval, each network asset search request associated with a network asset provider group, each network asset provider group associated with a group location and a group network asset type;
select a network asset provider record that includes a network asset provider location and a network asset type; and
generate a second prediction value for the network asset provider record that indicates a programmatically expected number of network asset transactions for the future network time interval.

14. The apparatus of claim 13, wherein one or more of the first prediction value and the second prediction value is based on a machine learning model.

15. The apparatus of claim 14, wherein the machine learning model comprises a random forest model that is trained with historical data.

16. The apparatus of claim 13, wherein the first prediction value is further based on historical network asset search request data.

17. The apparatus of claim 13, wherein each of the network asset provider location and group location comprises GPS coordinates.

18. The apparatus of claim 13, wherein the network asset search requests are requests for device rendered objects.

19. The apparatus of claim 18, wherein each device rendered object comprises one or more object attributes and an object location.

20. The apparatus of claim 19, wherein an object attribute of the one or more object attributes is an asset type.

21. The apparatus of claim 20, wherein the object location comprises GPS coordinates.

22. The apparatus of claim 13, wherein the processor is further configured to transmit device rendered objects to a remote network asset requester device based on the second prediction value.

\* \* \* \* \*